May 10, 1966 J. W. HASKELL 3,251,043

RECORD CARD MEMORIES

Original Filed April 26, 1962 3 Sheets-Sheet 1

INVENTOR
JOHN W. HASKELL

BY Leo J. Aubel
ATTORNEY

May 10, 1966 J. W. HASKELL 3,251,043

RECORD CARD MEMORIES

Original Filed April 26, 1962 3 Sheets-Sheet 3

3,251,043

RECORD CARD MEMORIES

John W. Haskell, Endwell, N.Y., assignor to International Business Machines Corporation, Armonk, N.Y., a corporation of New York Continuation of application Ser. No. 190,292, Apr. 26, 1962. This application Nov. 23, 1964, Ser. No. 414,513
10 Claims. (Cl. 340—173)

Figures 1, 1A:
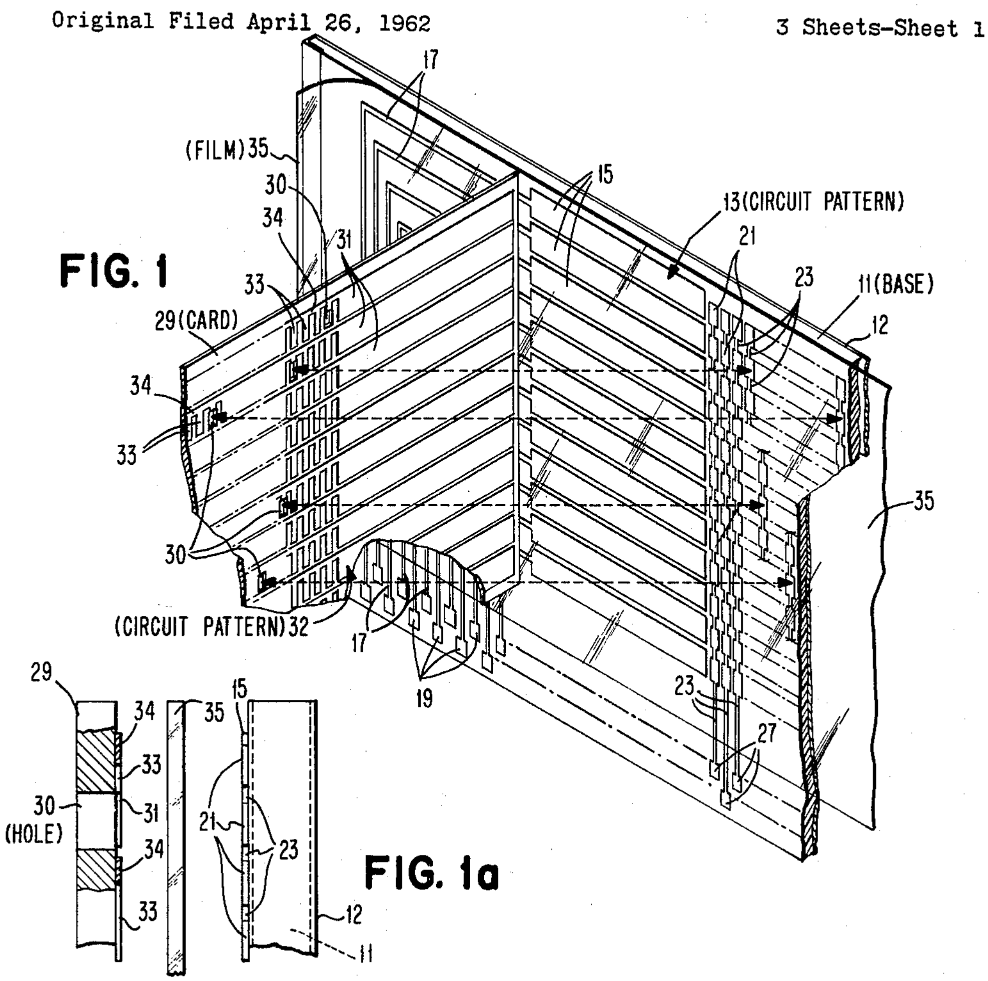

This is a continuation of my copending application Serial No. 190,292, filed April 26, 1962, and now abandoned.

This invention relates to semi-permanent read-only memories and in particular to record card memory systems.

In computing machines, it is frequently desired to have data stored therein which data is not subject to frequent alteration but which must be available for entry into the machine computations in extremely short access time. Such data has in the prior art, for example, been entered by means of preset electrical switches or by block boards. In such applications, it is the desired criteria that the date contained in the storage apparatus be instantly available upon the demand of the computer, that the data be contained in a compact and economical structure, and that the data be changeable but not necessarily changeable on the control of the computer. The foregoing type of data memories are the so-called semi-permanent read-only type; it is a main criteria that the format of read-only memories be variable at the will of the operator or in response to the desired operation, addressing scheme, or output code desired.

Semi-permanent read-only memories, for example, are particularly useful in code converters to convert an input signal in a first code to an output in a second code; then in the event an output is desired which is in a third code, a different semi-permanent read-only memory is provided to convert from the first code to the third code.

Marked or punched records have been demonstrated to be adaptable and useful in semi-permanent memories.

Accordingly, it is a principal object of the present invention to provide an improved read-only memory employing marked or perforated records wherein a plurality of marks or perforations have intelligible significance.

It is another object of the present invention to provide a read-only memory having improved energy coupling means.

It is another object of the present invention to provide a read-only memory having improved means for capacitive energy coupling.

It is another object of the present invention to provide an improved read-only memory in which a record card functions as one electrode of a capacitor to provide capacitive coupling for signal energy.

It is still another object of the present invention to provide an improved read-only memory in which a record card provides a capacitive coupling between the input and output portions of a circuit comprising a pattern of conductive elements.

It is yet another object of the present invention to provide an improved read-only memory which is relatively simple and inexpensive in construction.

In a preferred embodiment of the invention, a read-only memory is provided having a base or substrate on which is formed an etched circuit in a suitable pattern of rows and columns of conductive material, an insulating material is placed over the etched circuit, and a record card having conductive circuit pattern formed thereon is positioned over the insulating material. The card circuit pattern is formed in rows and columns and is arranged to mate with the circuit formed on the base. Marks or perforations are formed or punched on said card and are representative of intelligible code information.

A signal applied to selected ones of the conductive columns on the base couples capacitively to the conductive rows formed on the card. The signal is then connected electrically through said card rows to the output portion of the card whence the signal is coupled capacitively fro the card rows to the rows on the base. At those points where, for example, perforations have been formed on the cards, there will be no capacitive coupling between the base column and the card row; hence, no output will be obtained at this juncture. By selectively coding the marks or perforations on the card, an intelligible data output is obtained.

The foregoing and other objects, features and advantages of the invention will be apparent from the following more particular description of preferred embodiments of the invention, as illustrated in the accompanying drawings.

In the drawings:

FIG. 1 is an isometric, partly exploded, view of one embodiment of the invention showing the base or substrate, an insulative film, and a record card positioned adjacent the base to show the correspondence of the pattern on the base to the pattern on the card.

FIG. 1*a* is an enlarged, fragmentary, exploded end view partly in cross section, of a base, the associated card and the insulative film of FIG. 1.

Figure 1B:
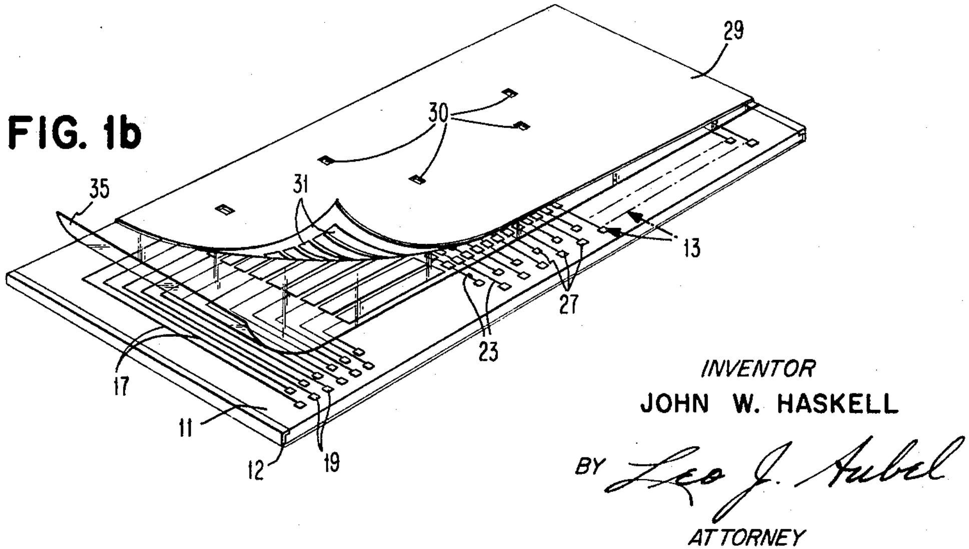

FIG. 1*b* is an isometric view showing the positioning, in an operative relation, of the card, the film, and the base of the embodiment of FIG. 1.

Figures 2, 2A, 2B:
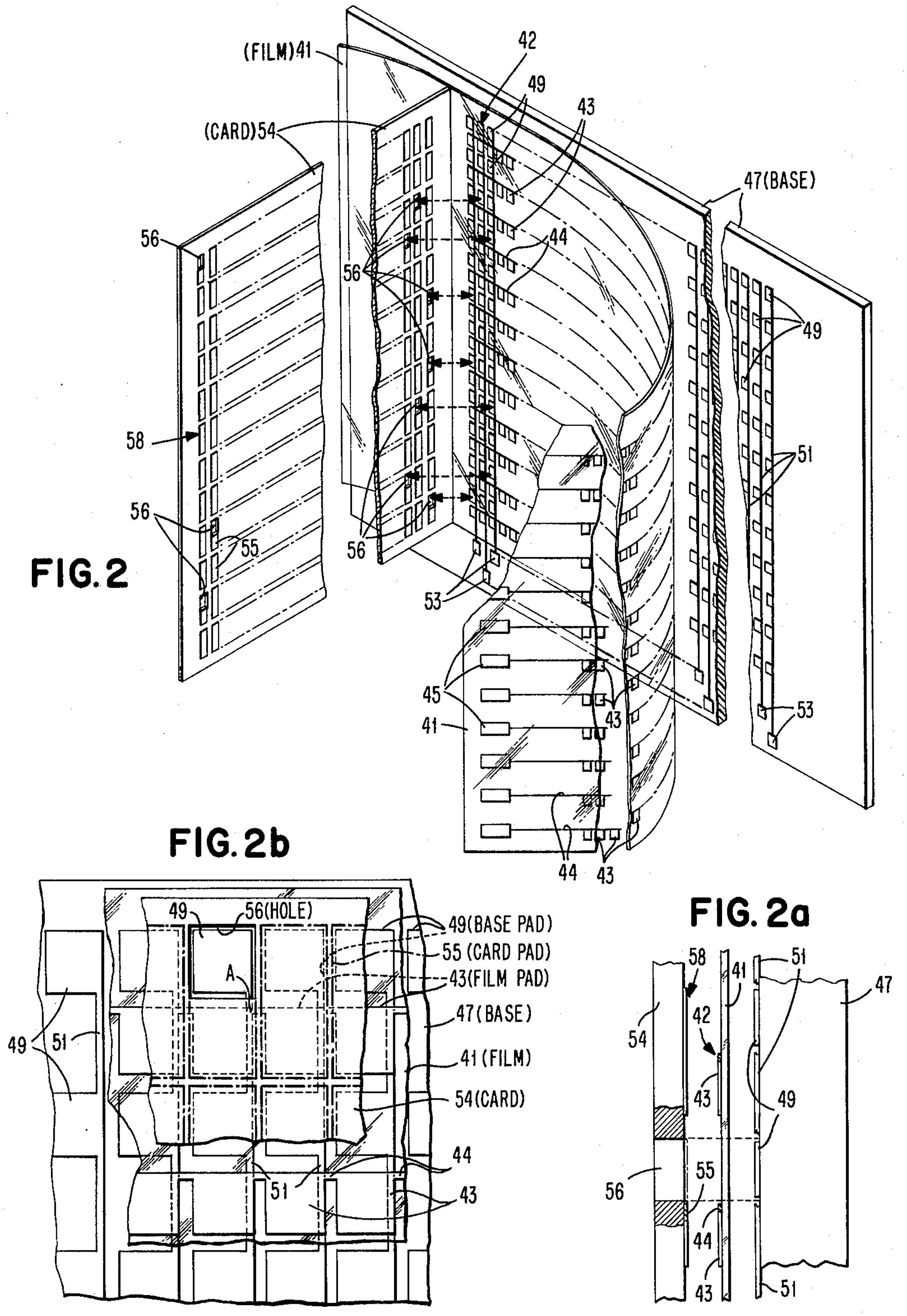

FIG. 2 is an isometric, partly exploded view, similar to FIG. 1, showing another embodiment of the invention.

FIG. 2*a* is an enlarged, fragmentary, exploded end view, partly in cross section, of a base, the associated card, and the film of FIG. 2.

FIG. 2*b* is an enlarged, fragmentary front view of the embodiment of FIG. 2.

Figure 3:
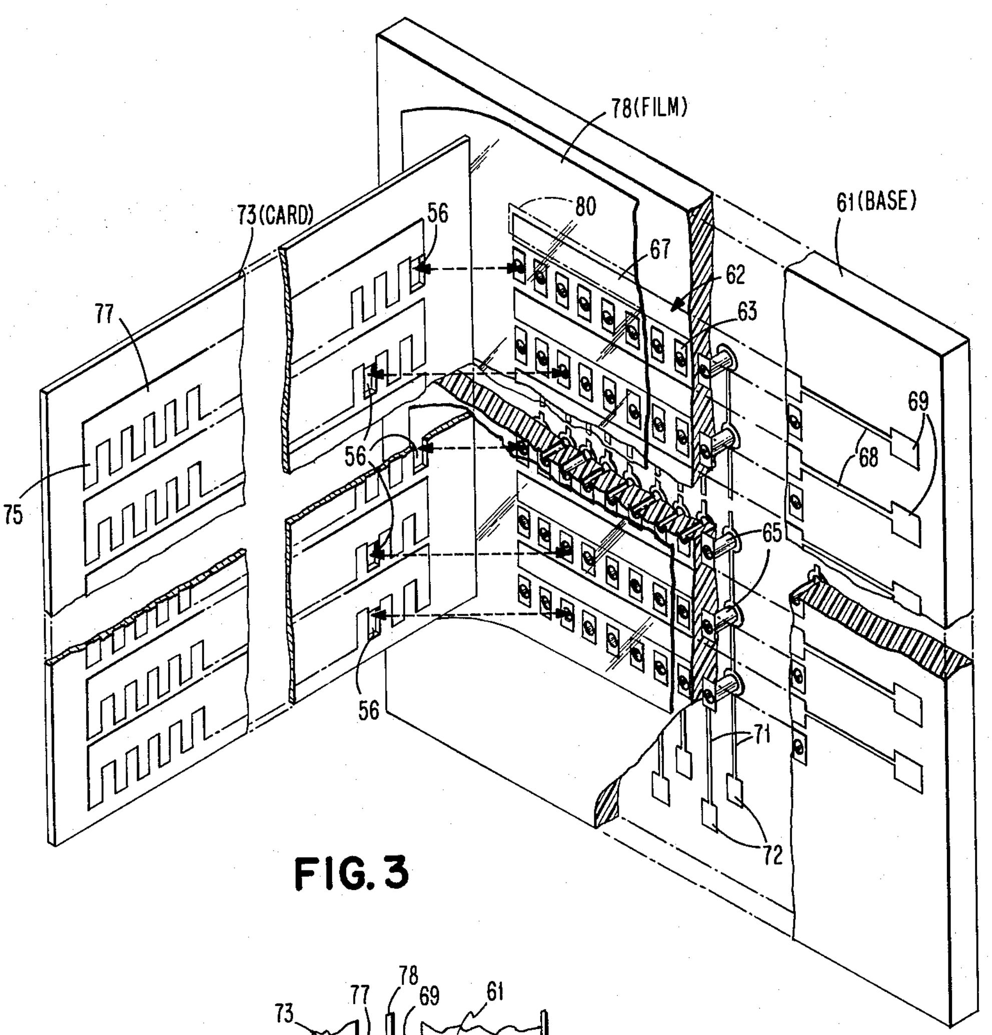

FIG. 3 is an isometric, partly exploded view, similar to FIG. 1, showing another embodiment of the invention.

Figure 3A:
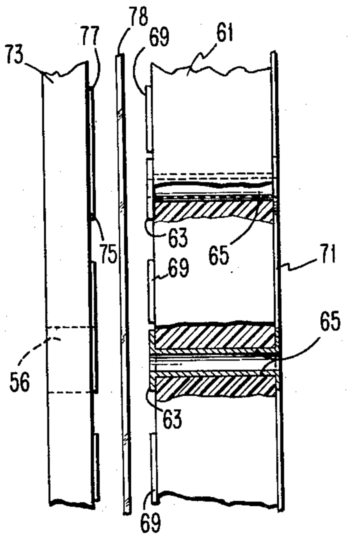

FIG. 3*a* is an enlarged, fragmentary end view, partly in cross section, of the embodiment of FIG. 3.

Referring to FIGS. 1, 1*a* and 1*b*, one embodiment of the card capacitor memory comprises an insulating base or substrate 11 of any suitable known type such as, for example, glass epoxy. For purposes of rigidity in construction and electrical grounding, a sheet of copper 12 is affixed to one face of base 11. A photo-etched circuit 13, for example copper, is formed on the base 11 in a designated pattern of vertical columns and horizontal rows as will be described. The pattern of circuit 13 includes a group of horizontal conductive strips 15 connected by respective conductive lines 17 to terminals 19. In the one embodiment shown in FIG. 1, there are twelve strips 15. The pattern of circuit 13 also includes a group of conductive pads 21 formed in rows and columns. Pads 21 are connected in columns by conductive lines 23; that is, all the pads in a column are connected through the associated line 23 to a terminal 27. In the embodiment shown, there are 64 columns of these conductive pads 21 with twelve pads in each column.

A thin plastic insulative film 35 is positioned over the conductive pattern 13 of base 11.

A record card 29 has a conductive pattern 32 formed thereon which pattern is arranged to mate with substrate pattern 13. Record card 29 can be of any suitable size and shape; for one practical embodiment, a regular size (3¼" x 7⅜") Hollerith type card has been employed. The pattern 32 on card 29 includes a group of strips 31; each of the strips 31 is formed of a conductive material such as silver paint or conductive ink, and each of the strips 31 is connected to a conductive row line 34, which may be formed of the same conductive material. Pattern 32 also includes a group of conductive pads 33, of the same material as strips 31, which extend from line 34 and form a horizontal (as oriented in FIG. 1) comb-like pattern with line 34; line 34 forming the top of the comb. As indicated above, strips 31 and pads 33 on card 29 are arranged to mate with the strips 15 and pads 21, respectively, of the base pattern 13; this is indicated in FIGS. 1 and 1*b*.

Card 29 has perforations or holes 30 formed therein as by punching, which holes are representative of suitable coded intelligible information to be processed.

An input signal can be coupled to terminals 19 and the output obtained on terminals 27 or vice versa. In either case, the operation of the structure of the invention is similar, as will now be described.

Assume that the coded input signal is electrically coupled to base terminals 27 to energize selected ones of the column lines 23; the base pads 21 connected to the selected lines 23 will be energized. This energy on the base pads 21 will capacitively couple through the film 35 to the respective mating card pads 33 when it will couple electrically through lines 34 to the card strips 31. From strips 31, the energy will be capacitively coupled to the strips 15 on base 11, and thence will be coupled electrically through base lines 17 to base terminals 19.

Intelligible coded information from terminals 27 is translated or converted to a desired coded output signal by punching holes 30 in a coded pattern into card 29, that is, by forming perforations in selected pads 33 of card 29. Wherever a card pad 33 is perforated to partially or completely remove the pad, there will be little or no capacitive coupling from a base pad 21 to the associate card pad 33. Thus, the coded input signal coupled to base terminals 27 is translated as determined by the perforated coding in card 29, and then is coupled out through base terminals 19.

Note that a capacitive means, that is a capacitor is provided by each pad 21 on base 11 which forms one electrode of the capacitor, the film 35 which forms the insulative medium of the capacitor, and the associated pad 33 on card 29 which forms the other electrode of the capacitor. At any point where the pads 33, or a portion of pads 33, are punched or removed, one electrode of the capacitor is removed such that the capacitive coupling is essentially eliminated at that point.

As indicated above, the input signals can be applied to terminals 19 and the output signals are obtainable from terminals 27; the operation of the structure will be similar to that described above. More specifically, in this instance, the input signal coupled to terminals 19 will connect electrically through base lines 17 to base strips 15; the energy will capacitively couple from base strips 15 to the associated card strips 31 when it will couple electrically through the respective card lines 34 to the associated card pads 33. From card pads 33 the energy will couple capacitively to base pads 21 and thence it will couple electrically through base column lines 23 to the output terminals. As noted, perforations 30 formed on the selected card pads 33 will prevent capacitive coupling at selected points to thus represent intelligible coded information.

A second embodiment of my invention is shown in FIG. 2. The embodiment of FIG. 2 is similar to the embodiment of FIG. 1, but differs from FIG. 1 in the fact that a conductive row line pattern 42 is formed on one face of an insulative film 41.

The conductive circuit pattern on base 47 comprises a plurality of pads 49 connected to column lines 51. The pads 49 form a vertical (as oriented in FIG. 2) comb-like pattern with the associated line 51; line 51 forms the solid or connecting edge of the comb and connects to a respective terminal 53.

The pattern 42 on film 41 comprises conductive pads 43 connected to respective conductive row lines 44. The pads 43 form a horizontal (as oriented in FIG. 2) comb-like pattern with the line 44; line 44 forming the top of the comb and connecting to a respective terminal 45. The pattern 42 on film 41 is arranged such that the film pads 43 are positioned intermediate the columns of pads 49, as shown in enlarged detail in FIG. 2*b*, and which will be described hereinbelow.

The circuit pattern 58 on card 54 is formed of conductive ink arranged as separate, distinct conductive pads 55 positioned in rows and columns. As shown in FIG. 2*b*, each card pad 55 (indicated by the dot-dash lines in FIG. 2*b*) overlays a respective base pad 49, and a respective film pad 43. Perforations or holes 56, representative of coded data, are formed on card 54; the holes 56 are arranged so as to remove about one-half of the associated pad 55. For purposes of explanation, only one hole 56 is shown in FIG. 2*b*.

As shown in FIG. 2*a*, film 44 is positioned such that its conductive pattern 42 comprising pads 43 and lines 44 is juxtaposed to the card pattern 58 comprising pads 55.

In operation, the signal may be electrically coupled from the base terminals 53, to the base lines 51, and to base pads 49. Base pads 49 capacitively couple through the film 41 to the pads 55 on card 54. Note that card pads 55 are of a size to be superpositioned on the associated base pad 49 and the associated film pad 43. The energy capacitively coupled to card pads 55 is electrically connected from card pads 55 to the row pads 43 on film 41 and through line 44 on film 41 to terminals 45 also on film 41. To provide coded data signal, holes 56 are punched in card 54; each hole removes about one-half of a selected pad 55; this will remove one electrode of the capacitor, as discussed above, to interrupt any signal coupling at that point.

As in the case of FIG. 1, the input signal energy may be coupled to film terminals 45 and the energy translated through the card system of FIG. 2, and the output may be obtained at base terminals 53; in either case, the operation is similar.

A third embodiment of my invention is shown in FIGS. 3 and 3*a* and comprises a base 61 on one side of which is formed a pattern 62 of conductive pads 63 arranged in columns and rows, and conductive lines 67 formed intermediate each of the rows of pads. Each of the pads 63 has a hole 65 formed therethrough; each hole 65, that is the periphery of each hole, is metallized or plated with a conductive material for purposes to be described hereinbelow. Lines 67 each connect through respective conductive leads 68 to a respective terminal 69. On the opposite face of the base 61, columns of conductive lines 71 connect to respective terminals 72. Each of the metallized holes 65 formed on pads 63, that is the metallized periphery of the holes, connects to one of the column lines 71.

The card 73 used in conjunction with base 61 has formed thereon a pattern 74 comprising a plurality of conductive pads 75 arranged in a horizontal (as oriented in FIG. 3) comb-like pattern; line 77 forms the solid edge of the comb.

An insulative film 78 is positioned over the conductive pattern 62 of base 61.

In operation, input signal energy connected to base terminals 69 is coupled electrically through leads 68 to lines 67. This signal energy couples capacitively from base lines 67 to the associated conductive lines 77 on card 73 and the respective card pads 75. Thence, the signal energy is capacitively coupled from the pads 75 to the associated pads 63 on base 61. The signal energy is then electrically coupled through the metallized hole 65 to the other side or opposite face of the base 61 and thence to the associated column lines 71 and terminals 72. When no coupling is desired at a given point, a hole 56 is punched in card 73 such that about one-half of the desired selected pad 75 is removed to eliminate one electrode of the coupling capacitor as discussed above.

As in the case of FIGS. 1 and 2, the embodiment of FIG. 3 is bi-directional, that is, the input signal energy may also be connected to terminals 72 and the output taken from terminals 69; the operation of the circuit is similar in either case.

Note that in FIG. 3, a first capacitive coupling is obtained between base line 67 and card line 77, and a second capacitive coupling is obtained between card pads 75 and base pads 63.

In a modification of the structure of FIG. 3, the film 78 may be trimmed to remove those portions of the insulative film 78 which overlie the base conductive lines 67; this is indicated by the dot-dash lines 80 shown on film 78 adjacent the top row line 67. (So as not to clutter the drawing, the dot-dash lines on film 78 are not shown adjacent the other lines 67.) Thus, the lines 77 on card 73 can make direct electrical contact with the respective lines 67 on base 61. In this modification of the structure of FIG. 3, the capacitive coupling means between line 67 on base 61 and line 77 on card 73 is changed to direct electrical coupling.

If the capacitive coupling between a base line 67 and an associated card line 77 is indicated as C1, and the capacitive coupling between card pads 75 and the associated base pads 63 is indicated as C2; and, assuming that $C1=C2$, then since the capacitors are essentially in series, the addition of the two series capacities results in $$C1+C2=\frac{C1}{2}=\frac{C2}{2}$$

By eliminating one of the capacity coupling means, say C1 as indicated in the foregoing modification, the coupling capacitive will be C2 instead of $C2/2$. Thus, the capacity signal coupling may be doubled.

Alternatively, instead of removing those portions of the film 78 which overlie row line 67, the portions of the film 78 which overlie the base pads 63 may be removed. In this instance, the capacitive coupling between base pads 63 and card pads 75 is changed to electrical coupling. The capacity coupling will be doubled similarly as discussed in the preceding paragraph.

It has been found that the conductive patterns of pads on the cards of the various embodiments may be made by electrographic (conductive lead) pencil. In such cases, intelligible information may be readily entered by writing in, or erasing selected pads.

In the record card memories of the invention, the signal-to-noise ratio is a function of the electrical load and of the electrical drive; however, for relative evaluation purposes, the structures of FIGS. 1, 2 and 3 were compared. With a given load and drive, the structures of FIGS. 1 and 2 provided about a 4 to 1 signal-to-noise ratio; with the same given load and drive, the structure of FIG. 3 provided about an 8 to 1 signal-to-noise ratio, that is, there is less residual coupling and therefore, less noise generated in the structure of FIG. 3. This is believed due principally to the greater separation between the row lines and column lines in the structure of FIG. 3 as will now be explained.

Note that in each of the structures of FIGS. 1, 2 and 3, energy tends to transfer from lines extending in one direction to lines extending in a second direction; more specifically from column lines to row lines and vice versa. For example, in FIG. 1, assume the base column lines 23 are energized; energy will tend to be capacitively coupled or transferred from the energized column lines 23 to the card row lines 34 at each of the points where a column line crosses a row line. Similarly in the structure of FIG. 2, the base column lines 51, when energized, will tend to capacitively couple energy to the row lines 44 on film 41 at each of the respective cross over points. In the structure of FIG. 3, the base row lines 67, when energized, will tend to capacitively couple to the base column lines 71 at the cross over points.

Referring to FIG. 2*b*, the cross over points of row lines 44 formed on film 41 and the column lines 51 formed on base 47 are separated by the thickness of film 41, or about .002 inch. Where a hole 56 is punched in the card, there is to be no signal coupling; however, there will still be a residual coupling at point A between the column line 51 on base 47 and the row line 44 on film 41, which will in effect, develop a noise signal.

In the structure of FIG. 1, the column lines 23 formed on base 11 and the row lines 34 formed on card 29 are separated by film 35. Thus, the same relative separation exists between the row and column line cross over points of the structure of FIG. 1 as in the structure of FIG. 2.

In the structure of FIG. 3, and as noted above, the row lines 67 are formed on one face of base 61 and the column lines 71 are formed on the opposite face of base 61 such that the thickness of the base 61 separates the two groups of lines. In the embodiment of FIG. 3, the thickness of base 61 is .062 inch; hence, the separation of the cross over points is much greater than in the structure of FIGS. 1 and 2. Consequently, there is less residual coupling between the column and row lines; and, therefore, relatively less noise is generated in the structure of FIG. 3 than in the structures of FIGS. 1 and 2. However, the embodiments of FIGS. 1 and 2 are at present more economical to manufacture and, where lower signal-to-noise ratios are acceptable, these structures may be preferable.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A memory device comprising:

first means having a first pattern of conductive pads provided thereon, and having input terminals and output terminals for receiving input signals and delivering output signals, respectively;

a record card having a pattern of conductive pads arranged to substantially overlie respective ones of the pads of said first pattern;

insulative means interposed between the respective patterns on said first means and said card;

capacitive coupling means formed by each of the pads of said first pattern constituting one electrode of a capacitor, each of the associated pads on said record card constituting the other electrode of the respective capacitor, and the insulative means constituting the dielectric between the capacitor electrodes so as to provide a separate single capacitor at each point where the respective pads of the first means and card overlie each other;

said card having perforations at selected pads for effectively removing corresponding one capacitor electrodes for eliminating said capacitive coupling means at said selected pads, and means for transmitting input signals from said first means to a selectable group of conductive pads on said card in bypass of said insulative means by direct electrical coupling to cause output signals to be transmitted to said output terminals only at those locations where the said one capacitor electrodes remain intact and thus permit capacitive coupling back to said first means.

2. In a memory unit having a plurality of capacitors arranged in a coordinate array of rows and columns, the combination of one means providing a plurality of first conductors electrically insulated from each other and each connected in parallel to respective one plates of the capacitors in a particular row, other means providing a plurality of second conductors electrically insulated from each other and each serially connecting the respective other plates of the capacitor in a particular column, non-conductive means disposed between said one plates and other plates to constitute the dielectric for such capacitors, separate pluralities of input terminals and output terminals provided on said other means, means directly electrically coupling each input terminal to a corresponding one of said first conductors, and means directly electrically coupling each output terminal to a corresponding one of said second conductors, preselected ones of said one plates being removed at selected coordinate points to prevent capacitive coupling at such points to thereby denote a binary "0,"

whereby a signal applied to an input terminal on said other means will be transmitted to the corresponding first conductor by direct electrical contact and thence in parallel by capacitive coupling through all associated unremoved one plates in said one means back to said other means for transmission via the appropriate other plates and second conductors to the corresponding output terminals.

3. The combination according to claim 2, wherein said one means is a record having a size generally similar to that of a conventional tabulating card and the said one plates of the respective capacitors have a spacing and layout comparable to that between respective bit positions on such a card to enable removal of said one plates by the same equipment as is used to punch such conventional tabulating cards.

4. The combination according to claim 2, wherein said one means is a perforatable record that is removable from the unit without damage because electrical coupling is effected by direct abutting contact without need for physical detachment from electrical circuitry.

5. A memory unit, comprising, in combination, two non-conducting elements providing substantially planar adjacent surfaces, parallel conductive lines provided on said surface of one of said elements, one group of conductive pads extending laterally in parallel from each such line, each pad constituting one plate of a respective capacitor, other parallel conductive lines provided on the other of said elements, each line extending substantially orthogonally to the first-mentioned conductive lines for electrically interconnecting a respective other group of conductive pads provided on the other of said surfaces and constituting the respective other plates of corresponding capacitors, a unique capacitor being formed where distinctive pads of each group overlie each other, insulating means separating the pads of said one group from those of the other group to constitute the dielectric for said capacitors, input terminals and output terminals provided on said other element for receiving input signals and delivering output signals, respectively, each output terminal being directly electrically connected to a corresponding other conductive line, and a plurality of similar means each providing direct electrical coupling of a unique one of said first-mentioned conductive lines with a corresponding unique input terminal, preselected ones of said pads on said one element being perforated to effectively remove the capacitor plate constituted thereby, to prevent capacitive coupling through the latter plate and thus denote a binary state opposite that denoted when such coupling is permitted through such plate, whereby an input signal applied to an input terminal on said other element will be transmitted via the appropriate similar means to the corresponding conductive line on said one element and thence in parallel, via capacitive coupling at the points where pads are unperforated, back to the corresponding conductive lines and associated output terminals provided on said other element, thereby to provide coded binary outputs corresponding to the pattern of preselected perforations provided in said one element.

6. A memory device comprising, in combination:

two non-conducting members normally held together and having respective one portions with conductive areas making direct abutting electrical contact with each other, and respective other portions each with a grid arrangement of overlying conductive pads defining the respective plates of a plurality of capacitors;

one set of parallel conductive lines on one of said members, each line linking all pads along such line, and each such line being directly electrically connected to a respective one of said conductive areas on said one member;

another set of parallel conductive lines provided on the other member and arranged orthogonally to those of said one set, each such line linking all pads therealong, and such lines being electrically disconnected from said areas of said other member;

insulating means interposed between the respective other portions, but not said conductive areas, on the respective members so as to constitute the dielectric for the respective capacitors; and a group of input terminals for receiving input signals and a group of output signals for delivering output signals, both groups being provided exclusively on said other member, each terminal of one of said groups being directly electrically connected to a corresponding different conductive area on said other member, and each terminal of the other group being directly electrically connected to a corresponding different conductive line on said other member;

preselected ones of said pads on said one member being effectively removed at selected points according to a predetermined pattern of coded information to prevent capacitive coupling at said points to denote a binary state opposite that denoted when capacitive coupling is permitted, thereby to provide a coded binary ouput corresponding to said pattern.

7. The combination according to claim 6, wherein the terminals of said one group are the input terminals and those of said other group are the output terminals, whereby an input signal applied to a selected input terminal will be transmitted by direct electrical coupling from said other member to said one member and thence along the corresponding conductive line thereon and in parallel, by capacitive coupling at those places where pads along said line remain intact, back to the corresponding conductive lines and associated output terminals provided on said other member.

8. A memory device comprising, in combination:

a first member having a plurality of conductive pads connected in parallel to a plurality of parallel arranged conductive lines;

a second member having a plurality of conductive pads arranged to substantially overlie the pads of said first member and interconnected by conductive lines arranged substantially orthogonally to the said lines of said first member;

said members having a plurality of respective conductive areas, corresponding conductive areas of each member being directly electrically coupled to each other, and each conductive area of each member being directly electrically coupled with a respective conductive line of that same member;

insulating means separating the conductive lines and pads of said members from each other so as to constitute the dielectric for a plurality of distinctive capacitors each having two plates defined by the respective overlying pads of said members;
preselected ones of the pads on one of said members being effectively removed to prevent capacitive coupling at selected coordinate points according to a desired pattern of binary coded information;
the other of said members having input terminals and output terminals to which input signals are applied and from which output signals are taken, respectively,
whereby an input signal applied to a selected input terminal of said other member will be directly electrically coupled to said one member via the associated conductive areas on said members and thence capacitively coupled via the energized conductive line and associated pads of said one member back to said other member at those coordinate points where such associated pads have not been removed, to provide a binary coded output including a binary "1" where capacitive coupling occurs and a binary "0" where such coupling is prevented, and enable input and output signals to be exclusively applied to and taken from said other member to facilitate spearation of said one member from said other member.

9. A memory device comprising:
a base;
a pattern of conductive pad groupings formed on one face of said base;
a conductive line formed on said one base face adjacent each of said pads in said first grouping;
each of said pads having a metallized hole formed therein which extends through said base from one face to the opposite face;
other conductive lines on said opposite face electrically connecting each of said holes formed in second groupings of pads;
a record card having a pattern of conductive pad groupings formed thereon and arranged to mate with the respective pads on said base;
conductive lines on said card for electrically connecting each of the pads in first groupings;
said record card being perforated at selected pads to provide intelligible coded information;
an insulative film interposed between said base and said card to constitute the dielectric between separate distinctive capacitors, the respective plates of which are defined by mating pads on the base and card; and
means providing direct electrical contact between selected parts of said base and card adjacent said film,
whereby signal energy applied to one of said conductive lines in said base will be directly electrically coupled to the conductive lines on the card, then capacitively coupled back to the other conductive lines in said base via the unperforated card pads, corresponding base pads and metallized holes.

10. A memory device comprising:
a non-conductive base;
a pattern of conductive pads formed on one face of said base and arranged in rows and columns;
conductive lines formed on said one base face adjacent each row of pads;
each of said pads having a metallized hole formed therein extending through said base from one face to the opposite face;
other conductive lines on said opposite face for electrically connecting said holes in columns;
a record card having a pattern of conductive pads formed in rows and columns and arranged to mate with the respective pads on said base;
conductive lines on said card for electrically connecting said card pads in rows;
said record card being perforated at selected pad positions to provide intelligible coded information;
an insulative film interposed between said base and said card to constitute the dielectric between separate distinctive capacitors, the respective plates of which are defined by mating pads on the base and card;
whereby signal energy may be electrically coupled from one of the conductive lines on said base to the associated conductive row line on said card, capacitively coupled via the associated unperforated card pads to the corresponding base pads, then electrically coupled via said metallized holes to said other conductive lines on said base as translated coded information.

References Cited by the Applicant

UNITED STATES PATENTS

| | | |
|---|---|---|
| 3,003,143 | 1961 | Beurrier. |
| 3,011,156 | 1961 | MacPherson. |
| 3,098,996 | 1963 | Kretzmer. |
| 3,159,820 | 1964 | Oden. |
| 3,171,100 | 1965 | Rajchman. |

OTHER REFERENCES

J. Van Goethem: "The Capacitive Semi-Permanent Information Store and its Uses in Telephone Exchanges," Proceedings of IEE Supplement 20 Pt. B. B. vol. No. 7, 1960.

MacPherson & York: "Semi-Permanent Storage by Capacitive Coupling," IRE Transactions on Electronic Computers, September 1961.

BERNARD KONICK, *Primary Examiner.*

H. D. VOLK, *Assistant Examiner.*